(12) United States Patent
Choi

(10) Patent No.: US 7,337,451 B2
(45) Date of Patent: Feb. 26, 2008

(54) DISK DRIVE FOR REDUCING NOISE

(75) Inventor: Myung-ryul Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 579 days.

(21) Appl. No.: 10/612,055

(22) Filed: Jul. 3, 2003

(65) Prior Publication Data

US 2004/0004928 A1 Jan. 8, 2004

(30) Foreign Application Priority Data

Jul. 4, 2002 (KR) ................ 2002-38663

(51) Int. Cl.
G11B 33/08 (2006.01)
(52) U.S. Cl. .................... 720/651
(58) Field of Classification Search ............. 720/611, 720/648, 649, 650, 651, 655
See application file for complete search history.

(56) References Cited

U.S. PATENT DOCUMENTS

| | | | | |
|---|---|---|---|---|
| 6,147,834 A * | 11/2000 | Srikrishna et al. | ...... | 360/97.02 |
| 6,493,310 B1 * | 12/2002 | Kim et al. | ............ | 720/611 |
| 6,948,176 B2 * | 9/2005 | Cho et al. | ............ | 720/600 |
| 2002/0075591 A1 * | 6/2002 | Chang et al. | ......... | 360/97.02 |

FOREIGN PATENT DOCUMENTS

| | | |
|---|---|---|
| JP | 11-317065 | 11/1999 |
| JP | 11317065 A * | 11/1999 |
| JP | 2000-048540 | 2/2000 |
| JP | 2000-357385 | 12/2000 |
| JP | 2001-110175 | 4/2001 |
| JP | 2001110175 A * | 4/2001 |
| JP | 2001176260 A * | 6/2001 |

(Continued)

OTHER PUBLICATIONS

Machine Translation of JP 11317065 A.*

(Continued)

*Primary Examiner*—William Korzuch
*Assistant Examiner*—Nathan Danielsen
(74) *Attorney, Agent, or Firm*—Staas & Halsey LLP

(57) ABSTRACT

A disk drive reducing noise, including a disk tray sliding in and out of the disk drive and on which a disk is placed. A disk driving portion rotates the disk at a predetermined speed. A disk chucking apparatus holds the disk on the disk tray. A data recording/reproducing unit records data on the disk or reproduces data from the disk. An air guide plate is installed between an upper surface of the disk tray and an upper cover plate of the disk drive, parallel to the disk tray, and separates an air flow area. Air flow above the disk generated by the rotation of the disk is divided into turbulence under the air guide plate and turbulence above the air guide plate. Thus, the flow of turbulence is controlled by the air guide plate so that it does not collide with a front side portion of the disk drive. Also, because the velocity of turbulence of a free flow layer under the air guide plate that collides with the front side portion decreases, noise transmitted to the front side portion is reduced.

34 Claims, 6 Drawing Sheets

FOREIGN PATENT DOCUMENTS

| | | | | |
|---|---|---|---|---|
| JP | 2001250301 | A | * | 9/2001 |
| JP | 2002-157858 | | | 5/2002 |
| KR | 1999-80545 | | | 11/1999 |
| KR | 2000-75152 | | | 12/2000 |
| KR | 2001-16753 | | | 3/2001 |

OTHER PUBLICATIONS

Chinese Office Action mailed Apr. 29, 2005 and English Translation of Chinese Office Action mailed Apr. 29, 2005.

Jewel B. Balrow, et al., "Low-Speed Wind Tunnel Testing", Third Edition, pp. 74-79, 90-91, no date.

* cited by examiner

DISK DRIVE FOR REDUCING NOISE

CROSS-REFERENCE TO RELATED APPLICATIONS

This application claims the priority of Korean Patent Application No. 2002-38663, filed Jul. 4, 2002 in the Korean Intellectual Property Office, the disclosure of which is incorporated herein by reference.

BACKGROUND OF THE INVENTION

1. Field of the Invention

The present invention relates to a disk drive, and, more particularly, to a disk drive that reduces vibration and noise generated during rotation of a disk.

2. Description of the Related Art

In general, disk drives record information on a recording surface, including concentric tracks of a disk, or read information from the recording surface. That is, data are recorded on the recording surface of a disk rotating with a linear velocity or read out from the recording surface, by emitting a laser beam from an optical pickup device sliding in a radial direction with respect to the disk.

FIG. 1 is a perspective view illustrating a conventional disk drive. Referring to FIG. 1, a conventional disk drive typically includes a disk tray 10 on which a disk 60 is loaded, a disk driving portion 20 rotating the disk 60, a disk chucking apparatus 30 having a chuck plate 31 and a disk chuck, an optical pickup device 40 performing data recording/reproduction and an optical pickup device driving portion 50. The disk tray 10 has a window 11 penetrating the disk tray 10 to facilitate operation of the disk chucking apparatus 30 and the optical pickup device 40.

To accurately read data recorded on a recording surface of the disk 60 or record data on the disk 60, a beam emitted from the optical pickup device 40 must be accurately incident on a track of the recording surface of the disk 60. Also, the optical axis of the beam emitted from the optical pickup device 40 must be maintained at a predetermined angle with respect to the recording surface of the disk 60. However, when vibration is generated by the rotating disk 60, recording and reproduction performance of the disk drive are deteriorated. Furthermore, as the speed of disk drives increases, the vibration generated during the rotation of the disk 60 has a considerable affect on reliability in data recording and reproduction. Also, noise generated during use of most office machines directly affects the office environment and work efficiency. Thus, removing or reducing the noise and vibration is very important.

The noise and vibration occurring during the rotation of the disk 60 are generated by friction between the surface of the rotating disk 60 and surrounding air; a difference in pressure around the disk 60; collision of air occurring between the rotating disk 60, the disk tray 10, and an inner surface of the disk drive, and perturbation generated according to the air collision ; and turbulence formed around the disk 60.

Conventional technologies to reduce noise and vibration generated in the disk drive have been developed. First, Korean Patent Publication No. 2000-75152 discloses a noise and vibration reduction technology to reduce the transmission of sound waves by filling gaps between constituent elements in the disk drive through which noise is discharged with a sound insulating material or a sound absorbing material, or using a muffler effect technology of a vehicle by forming a plurality of grooves at predetermined intervals along the outer circumference of a portion of a chuck plate of a disk chucking apparatus corresponding to an outer circumference of a disk.

Korean Patent Publication No. 2001-16753 discloses a technology of reducing noise and vibration that uses an auto-balancing mechanism in which balls are inserted in a plurality of races provided in a turntable of a disk. The balls move in a radial direction to compensate for the eccentricity of the turntable Korean Patent Publication No.1999-80545 discloses a noise reduction apparatus for reducing noise and vibration due to high speed turbulence flow by installing a plurality of blades on an upper surface of a disk tray that are separated at predetermined intervals, or forming a screw-type or vortex-type groove or dimple to reduce air resistance due to the shape of the profile of the disk, air friction on the upper and lower surfaces of the disk, collision with a wall surface due to a separation phenomenon at a leading end of the disk, and noise due to high speed turbulence flow during rotation of the disk. Thus, air resistance on the disk during rotation of the disk is reduced, a gradient in the speed of the air flow in a boundary layer of the upper and lower surfaces of the disk is removed, and collision of high speed air flow at the leading end of the disk is prevented.

FIG. 2 is a view depicting the flow of air above the upper surface of a rotating disk. Referring to FIG. 2, rotational turbulence 80 generated during rotation of the disk 60 rotates in the same direction as the rotation direction of the disk 60 between the upper surface of the disk 60 and a cover 70 of the disk drive. That is, when the disk 60 rotates clockwise, the rotational turbulence 80 rotates clockwise as well. The rotation speed of the rotational turbulence 80 is about 0.5 times the disk rotation speed. The speed of the rotational turbulence 80 is distributed such that a boundary layer (not shown) forms near the rotating disk 60 and also near an upper cover plate (not shown) of the disk drive. A free flowing layer of air forms between the two boundary layers.

The rotational turbulence 80 collides with surrounding structures such as the window portion 11 formed in the disk tray 10, the optical pickup device 40, and a gear portion (not shown) disposed under the disk tray 10, to generate a perturbation component. In particular, a strong rotational turbulence is formed in the free flow layer, which generates vibration and noise by colliding with or causing friction with the structures.

Thus, it is important to reduce noise and vibration generated by the disk rotation by weakening or removing the turbulence by removing the perturbation component. Also, even when the chuck plate 31 is provided, perturbation is generated due to the collision of air flow in the front side portion of the disk drive and, accordingly, flow noise is generated and transmitted outside the front side portion of the disk drive. Because the rear side portion of the disk drive is within the main body of a computer, noise generated here may not be a problem. However, the noise transmitted outside the front side portion of the disk drive is very important. Therefore, an appropriate solution to control this problem is needed.

SUMMARY OF THE INVENTION

It is an aspect of the present invention to provide a disk drive that can reduce noise and vibration generated in the disk drive by weakening rotation turbulence generated by a rotating disk and a perturbation component generated by the collision between the rotational turbulence and structures in the disk drive.

Additional aspects and/or advantages of the invention will be set forth in part in the description that follows and, in part, will be obvious from the description, or may be learned by practice of the invention.

To achieve the above and/or other aspects of the present invention, there is provided a disk drive for reducing noise including a disk tray sliding in and out of the disk drive and on which a disk is placed, a disk driving portion rotating the disk at a predetermined speed, a disk chucking apparatus holding the disk on the disk tray, a data recording/reproducing unit recording data on the disk or reproducing data from the disk, and an air guide plate installed between an upper surface of the disk tray and an upper cover plate of the disk drive, parallel to the disk tray, and separating an air flow area, the air flow above the disk generated by rotation of the disk being divided into turbulence under the air guide plate and turbulence above the air guide plate.

The air guide plate includes an end portion having a wedge shape that is inclined in a direction in which the air flow above the disk proceeds to move the air flow above the disk up along the air guide plate.

The disk drive includes a first guide installed on the air guide plate, perpendicular to an upper surface of the air guide plate, along an edge of the air guide plate to rotate the air flowing up along the air guide plate in a same direction as a direction in which the disk rotates.

The disk drive includes a second guide installed on the air guide plate parallel to the first guide, separated a predetermined distance from the first guide, and perpendicular to the upper surface of the air guide plate, to divide a passing route of the air flow into two or more routes and rotate the air flowing up along the air guide plate in the same direction as the direction in which the disk rotates.

The disk drive further includes a guide vein installed on the air guide plate to rotate the air flowing up along the air guide plate in the same direction as the direction in which the disk rotates.

The disk drive further includes a porous air flow control unit installed on the air guide plate to attenuate a strength and a perturbation component of the turbulence flowing above the air guide plate.

The air flow control unit includes a mesh screen installed on the air guide plate having a screen structure to attenuate turbulence flowing above the air guide plate in an axial direction and a honeycomb structure to attenuate turbulence in a lateral direction.

A through hole is formed at a central portion of the air guide plate through which the disk chucking apparatus is installed.

To achieve the above and/or other aspects according to the present invention, there is provided a disk drive including a disk tray receiving a disk that is rotated, producing turbulence having a turbulence area above the rotating disk; an upper cover plate covering the disk drive; and an air guide plate placed between the disk tray and the upper cover plate to separate air flow above the rotating disk into turbulence under the air guide plate and turbulence above the air guide plate, the turbulence above the air guide plate being unaffected by the rotating disk, and the turbulence area under the air guide plate being reduced to reduce the turbulence above the rotating disk.

To achieve the above and/or other aspects according to the present invention, there is provided a noise reducing apparatus for a disk drive, the disk drive having an upper cover plate covering the disk drive and a disk tray receiving a disk that is rotated, the rotating disk producing turbulence having a turbulence area above the rotating disk, the noise reducing apparatus including an air guide plate placed between the disk tray and the upper cover plate to separate air flow above the rotating disk into turbulence under the air guide plate and turbulence above the air guide plate, the turbulence above the air guide plate being unaffected by the rotating disk, and the turbulence area under the air guide plate being reduced to reduce the turbulence above the rotating disk thereby reducing noise of the disk drive; an end portion of the air guide plate having a wedge shape that is inclined in a direction of the air flow to move the air flow above the disk up along the air guide plate, reducing a perturbation portion of the turbulence above the air guide plate; a first guide installed on the air guide plate along an edge of the air guide plate to rotate the air flowing up along the air guide plate in a same direction as a direction in which the disk rotates, reducing turbulence at a front edge of the disk drive; a second guide installed on the air guide plate, parallel to the first guide and separated a predetermined distance from the first guide, to divide a passing route of the air flow into two or more routes and rotate the air flowing up along the air guide plate in the same direction as the disk rotation direction; a guide vein installed on the air guide plate to rotate the air flow moving up along the air guide plate in the same direction as the disk rotation direction, reducing turbulence generated above the air guide plate where a direction of the air flow changes; and a porous air flow control unit installed on the air guide plate to attenuate a strength and a perturbation component of the turbulence flowing above the air guide plate.

To achieve the above and/or other aspects according to the present invention, there is provided a noise reducing apparatus for a disk drive, the disk drive having an upper cover plate covering the disk drive and a disk tray receiving a disk that is rotated, the rotating disk producing turbulence having a turbulence area above the rotating disk, the noise reducing apparatus including an air guide plate placed between the disk tray and the upper cover plate to separate air flow above the rotating disk into turbulence under the air guide plate and turbulence above the air guide plate, the turbulence above the air guide plate being unaffected by the rotating disk, and the turbulence area under the air guide plate being reduced to reduce the turbulence above the rotating disk thereby reducing noise of the disk drive; and an end portion of the air guide plate having a wedge shape that is inclined in a direction of the air flow to move the air flow above the disk up along the air guide plate, reducing a perturbation portion of the turbulence above the air guide plate.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and/or advantages of the invention will become apparent and more readily appreciated from the following description of the preferred embodiments, taken in conjunction with the accompanying drawings, of which.

DETAILED DESCRIPTION OF THE INVENTION

Figure 1:
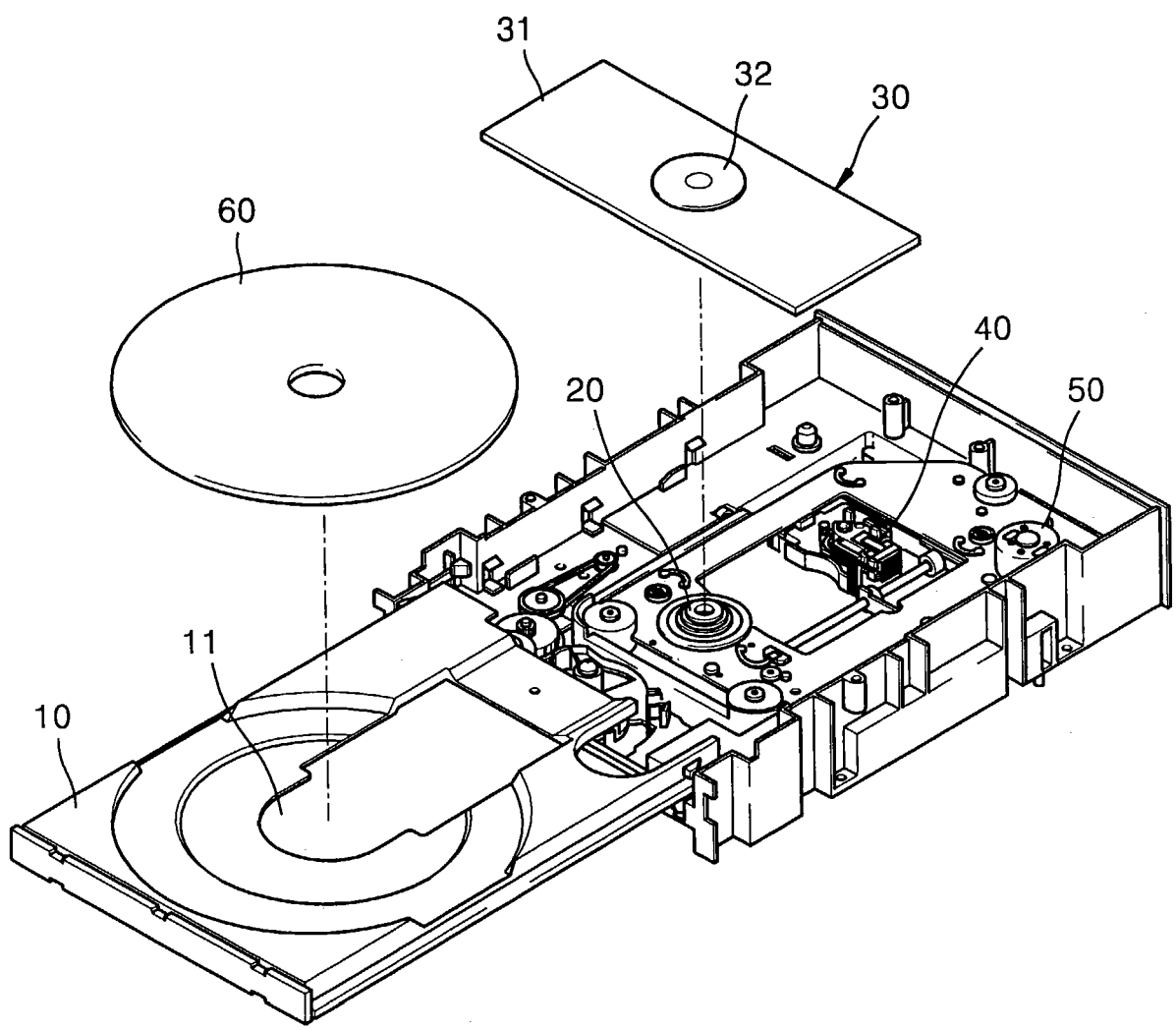
FIG. 1 is a perspective view illustrating a conventional disk drive.
Figure 2:
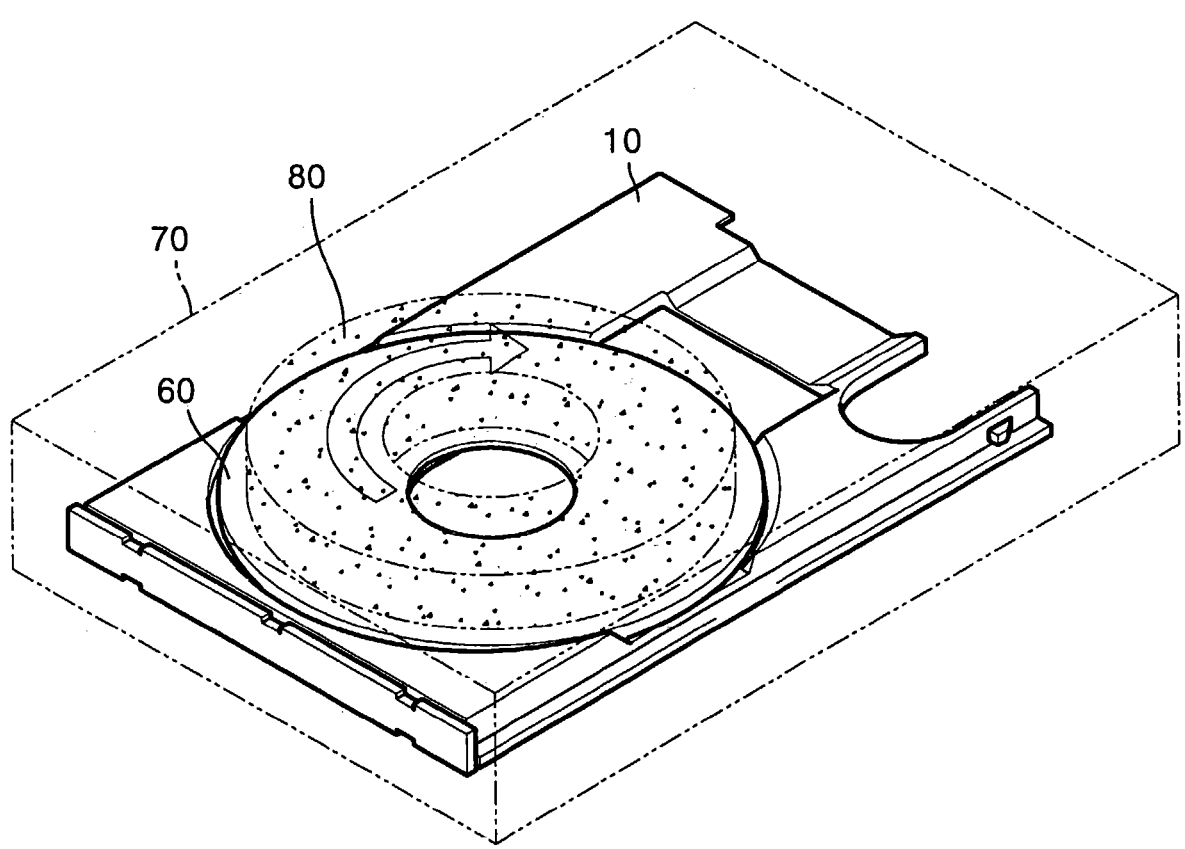
FIG. 2 is a view depicting the flow of air above a rotating disk.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 3:
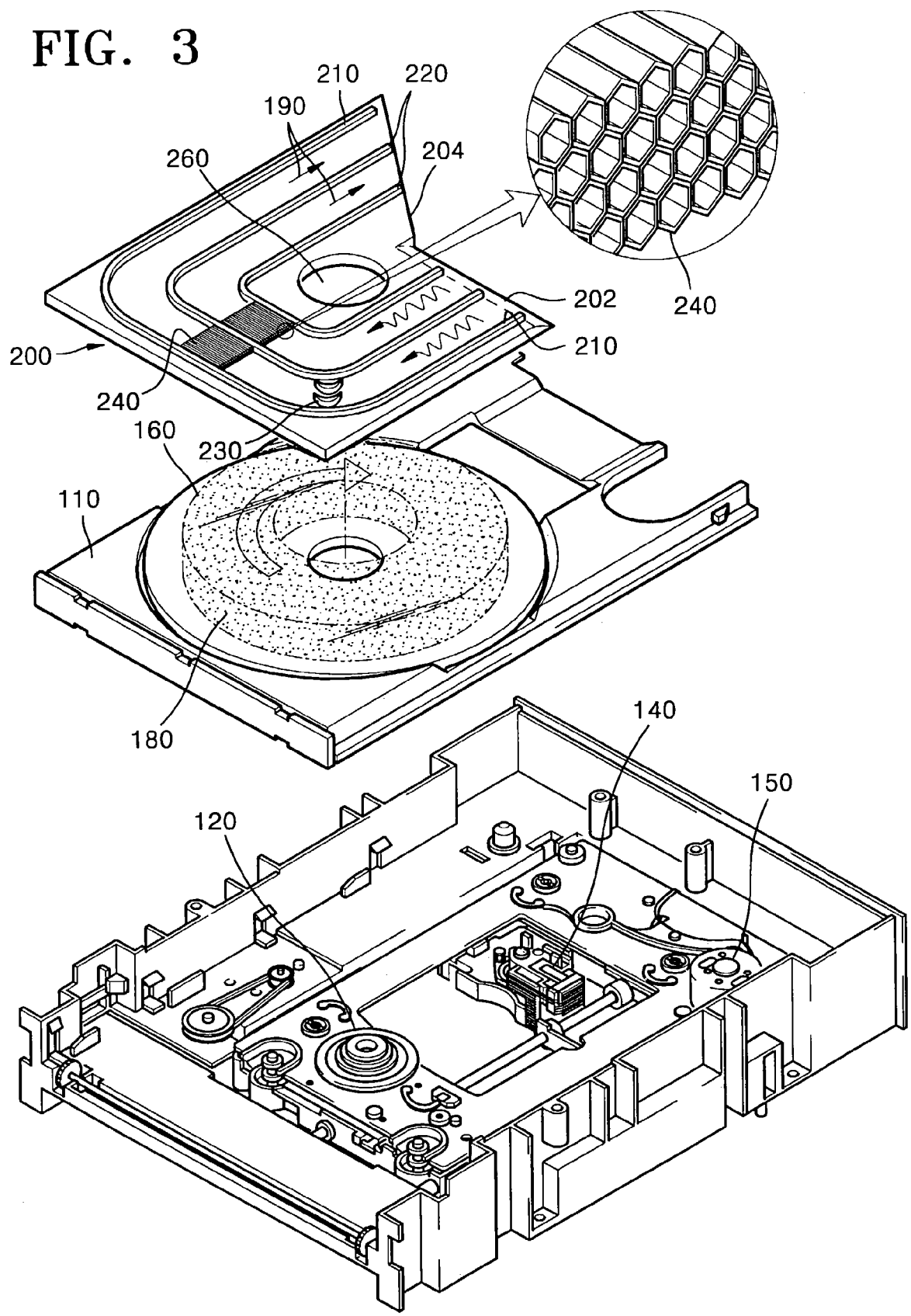
FIG. 3 is an exploded perspective view depicting a structure of a disk drive according to an embodiment of the present invention.

Referring to FIG. 3, a disk drive according to the present invention includes a disk tray 110, a disk driving portion 120, a disk chucking apparatus (not shown), a recording/reproducing unit, such as an optical pickup device 140, and an optical pickup device driving portion 150.

The disk tray 110 is installed in the front side of the disk drive and slides in and out of the disk tray 110 to load or unload a disk 160 mounted thereon. The disk driving portion 120 includes a turntable on which the disk 160 is placed and a spindle motor (not shown) installed under the turntable to rotate the turntable, which rotates the disk 160 at a predetermined speed. The disk chucking apparatus has a magnetic body that attaches to a magnet provided at the center of the turntable to fix the disk 160 to a rotation shaft (not shown). The optical pickup device 140 includes a laser diode (not shown) as a light source, a collimating lens (not shown) for making radiating light a parallel beam, a polarization prism (not shown), a mirror (not shown), and an objective lens (not shown). The optical pickup device 140 slides in a radial direction across the disk 160, which is rotating, to record or read data on or from a recording surface of the disk 160 by emitting a laser beam. Also, the optical pickup device driving portion 150 includes a motor and a gear or belt (not shown) to make the optical pickup device 140 slide in the radial direction with respect to the rotating disk 160.

FIGS. 4A through 4D are views depicting an air flow field in the disk drive according to the present invention, in particular, a field of flow due to the air flow generated above the rotating disk 160.

The flow above the rotating disk 160 can be expressed by the following equation.

$$\frac{\mathrm{D}u}{\mathrm{D}t} = -\frac{1}{p}\frac{\partial p}{\partial r} + \frac{v^2}{r} + \text{viscous term}$$

Here, u is the velocity of flow of air in a radial direction r, and v is the velocity of flow of air in a rotational direction θ of the disk. Here, the viscous term is ignored and it is assumed that a pressure gradient term $$\frac{\partial p}{\partial r}$$

in the radial direction r is constant.

Figure 4A:
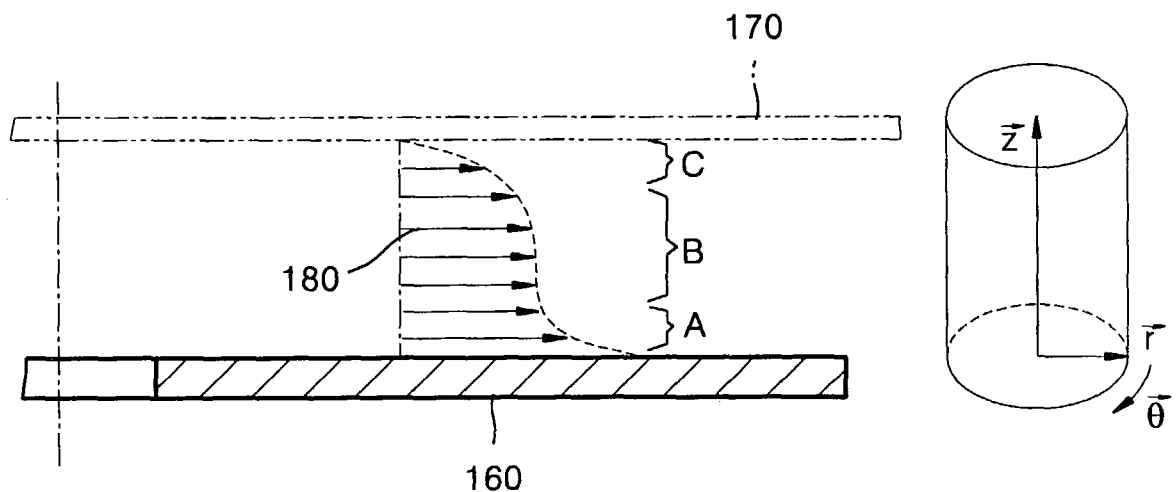
FIG. 4A is a view showing distribution of speed of air flow in a rotational direction (θ) above a rotating disk.
Figure 4B:
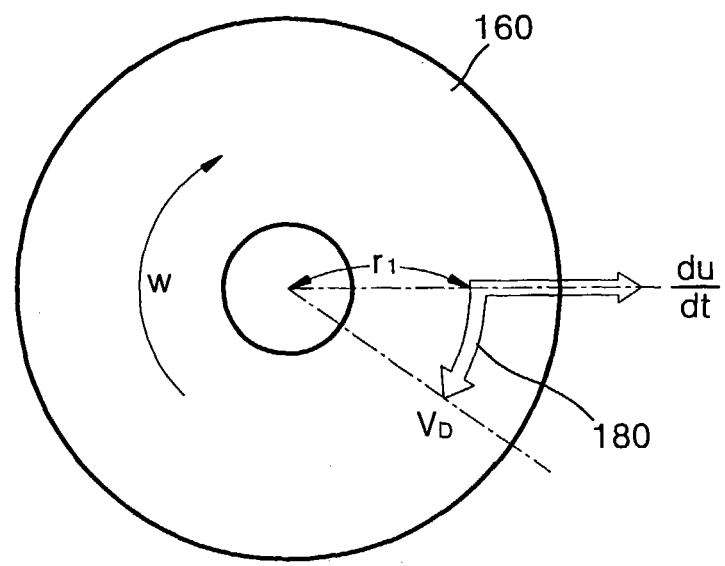
FIG. 4B is a view depicting the flow of turbulence above the rotating disk.

FIG. 4A is a view depicting distribution of the velocity v (i.e., rotational velocity) of rotational turbulence 180 between the inner wall of an upper cover plate 170 and the disk 160, which is rotating, in the rotational direction θ of the disk 160. FIG. 4B is a view depicting the flow of turbulence (i.e., rotational turbulence 180) above the rotating disk 160 generated by rotation of the disk. The velocity v is 0 at the inner wall of the upper cover plate 170 (v=0). When the rotational angular velocity ω is θ̇, the rotational angular velocity of the disk at a position where r=r1 in the radial direction from the rotational center of the disk 160 is v=r1·θ̇=$v_D$. In the distribution of velocity between the inner wall of the upper cover plate 170, which is not rotating, and the disk 160, which is rotating, there is an area C that is a boundary layer around the inner wall of the upper cover plate 170, an area A that is a boundary layer around the rotating disk 160, and an area B that is a free flow layer between the area A and the area C. In other words, the areas A and C are boundary areas in which the flow of air is severely affected by frictional resistance of the inner wall of the upper cover plate 170 and the disk 160. The area B is a free flow layer separated from the boundary surface to a degree and is out of the influence of the boundary surfaces to have a free flow velocity.

The rotational velocity v of the rotational turbulence 180 above the rotating disk 160 is $v_D$. Because the velocity square term $$\frac{v^2}{r}$$

of the above equation is substantially greater than the pressure gradient term $$\frac{1}{p}\frac{\partial p}{\partial r},$$

the right side of the equation becomes a positive value. Thus, turbulence is generated above the surface of the rotating disk 160 in a direction $+\vec{r}$ toward the outer circumference of the disk 160.

Figure 4C:
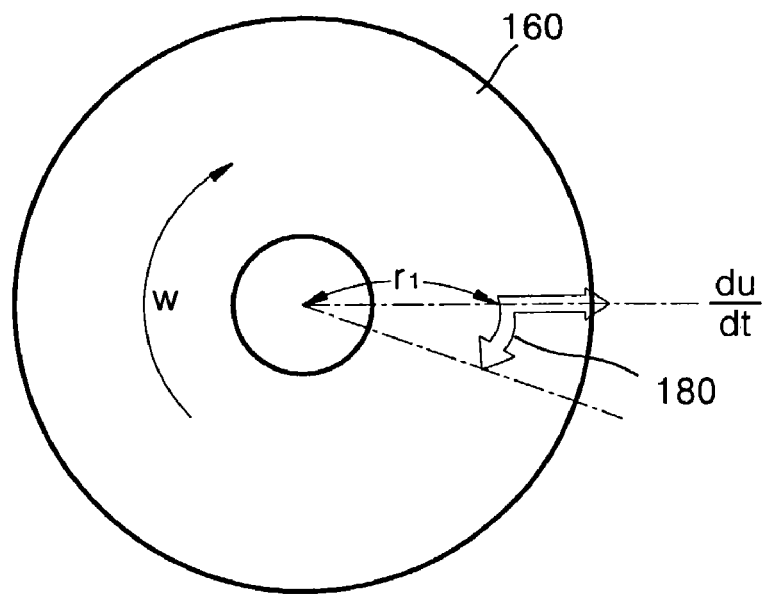
FIG. 4C is a view depicting the flow of turbulence in a free flow layer generated by the rotation of the disk.
Figure 4D:
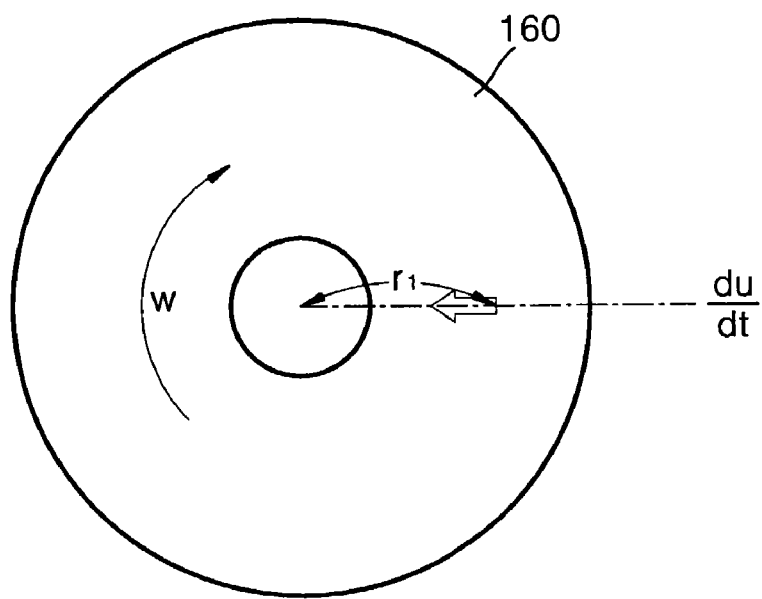
FIG. 4D is a view depicting the flow of turbulence above an inner wall of an upper cover plate of the disk drive generated by the rotation of the disk.

FIG. 4C is a view depicting the flow of turbulence in the free flow layer generated by the rotation of the disk. FIG. 4D is a view depicting the flow of turbulence above the inner wall of the upper cover plate of the disk drive generated by the rotation of the disk 160. Referring to FIG. 4D, because the rotational velocity v of the rotating turbulence 180 at the inner wall of the upper cover plate 170 is 0 (v=0), only the pressure gradient term is left so that the right side of the above equation becomes a negative value. Thus, flow in a direction $-\vec{r}$ toward the inner circumference is generated. Also, referring to FIG. 4C, because the velocity square term in the right side of the equation is relatively greater in the free flow layer, flow in the direction $+\vec{r}$ toward the outer circumference is generated.

Figure 5:
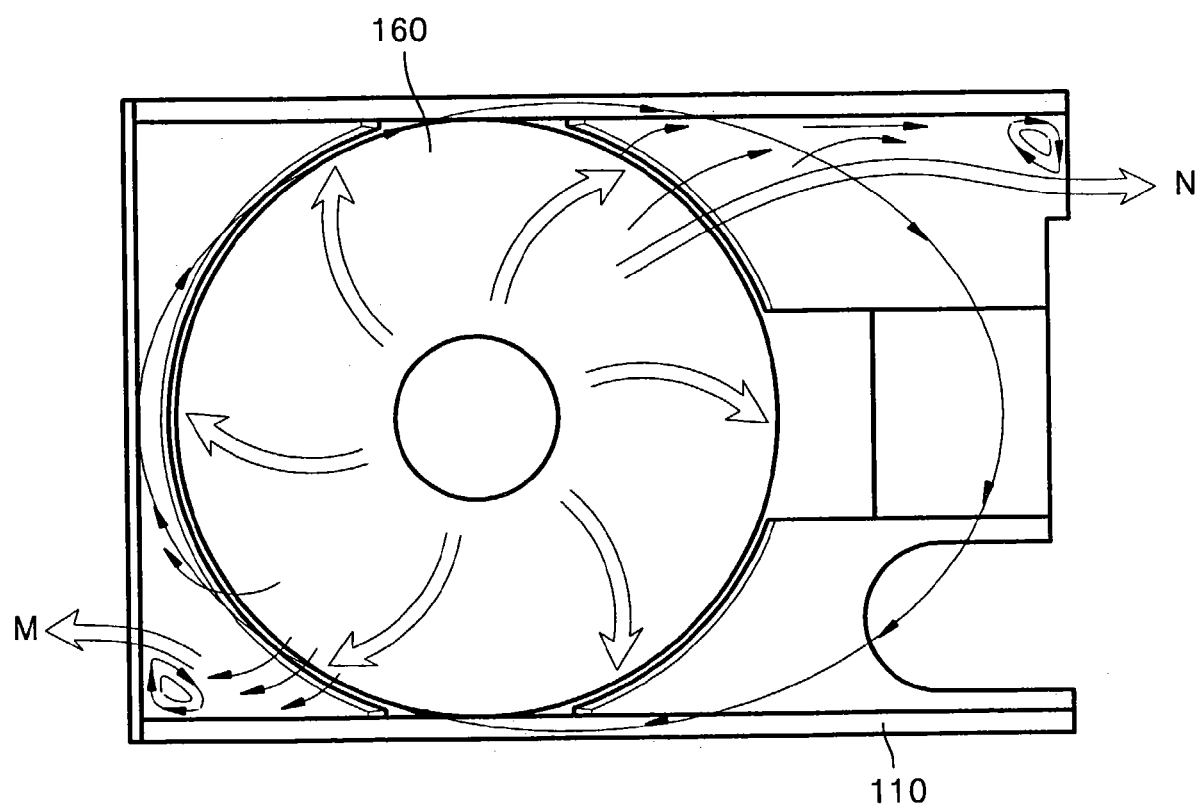
FIG. 5 is a view showing the flow of air generated by the rotation of the disk and the positions where the strength of noise due to the flow of air is greatest.

FIG. 5 shows the flow generated by the rotation of the disk 160 and positions where the strength of noise due to the flow is greatest. Referring to FIG. 5, the flow of air generated from the boundary layer around the disk 160 and the free flow layer due to the rotation of the disk 160 and proceeding toward the outer circumference of the disk rotates clockwise toward the outer circumference along the inner wall of the disk drive case as the disk 160 rotates clockwise. Thus, the entire air flow in the disk drive rotates in an oval shape in which the curvature toward the front end portion of the disk drive is greater than that of the rear end portion thereof. In view of the strength of noise, the air flow rotating clockwise toward the outer circumference of the rotating disk 160 of the disk drive collides with the side surface of the disk drive, forming perturbation and turbulence, and proceeds toward the front side portion of the disk drive. Thus, the strongest air flow is discharged from a position M toward the outside of the disk drive, thus generating noise having a high strength. Likewise, strong air flow is discharged from a position N symmetrical to the position M with respect to the center of rotation of the disk 160, thus generating a high level of noise.

Referring to FIG. 3, an air guide plate 200 is installed between the upper surface of the disk tray 110 and the upper cover plate 170 of the disk drive parallel to the disk tray 110 and divides the rotational turbulence 180 generated by the rotating disk 160 into two parts, that is, rotating turbulence generated by the rotation of the disk 160 under the air guide plate 200 and turbulence generated and controlled above the air guide plate 200.

The turbulence rotating under the air guide plate 200 has an area A which is a boundary layer around the upper surface of the rotating disk 160, an area C which is a boundary layer around the lower surface of the air guide plate 200, and an area B which is a predetermined free flow layer. However, the area B, which is a free flow layer, becomes very narrow or is removed, compared to the conventional disk drive without the air guide plate 200. Accordingly, the turbulence flow area that is present in the area B and very strong can be narrow or removed. In other words, by dividing the turbulence flow generated by the rotation of the disk 160 into two parts, the turbulence area having the original turbulence component, which is under the air guide plate 200 and uncontrollable, becomes very narrow so that the level of turbulence as a whole that generates noise is reduced.

The controlled turbulence above the air guide plate 200 is not directly influenced by the rotating disk 160. That is, the turbulence above the air guide plate 200 is out of the influence of the rotating disk 160, but receives a frictional force of the upper surface of the air guide plate 200 and the upper cover plate 170 of the disk drive, so that the strength of the turbulence and a perturbation component are greatly reduced.

The air guide plate 200 has an end portion 202 with a wedge-shaped profile so that air flows up along the air guide plate 200. A perturbation component increases severely when the flow of turbulence generated by the rotation of the disk 160 collides with structures in the disk drive, which increases noise. Thus, the separation of the flow area by the air guide plate 200 is performed before the turbulence collides with the structures or side wall. In light of the above, a wedge is formed at a first end portion 202 of the air guide plate 200, as shown in FIG. 3. When the flow area is divided at a position where the wedge is formed, the controlled air flow above the air guide plate 200 rotates clockwise along the air guide plate 200. Accordingly, the strength and a perturbation component of the turbulence are weakened and the controlled air flow meets the turbulence rotating under the air guide plate 200 at a second end portion 204 of the air guide plate 200 above the disk. Thus, while the turbulence passes through the air guide plate 200, the perturbation component is weakened so that noise is reduced.

The disk drive according to the present invention may include a first guide 210 installed along the outside of the air guide plate 200 to guide the air flowing up along the air guide plate 200 to flow in the same direction as the disk 160 rotation direction. The first guide 210 prevents turbulence at the edge of the front side portion of the disk drive above the air guide plate 200.

Also, a second guide 220 installed a predetermined distance from the first guide 210 on the air guide plate 200 divides a passing route of the air flow into two or more routes 190 and guides the air flowing up along the air guide plate 200 to flow in the same direction as the disk 160 rotation direction. Multiple second guides 220 may be provided to not only guide the air flow, but also reduce the perturbation component due to friction force.

Also, a guide vein 230 installed on the air guide plate 200 to guide the direction of the air flowing up along the air guide plate 200 may be provided. The guide vein 230 prevents turbulence that may be generated where the direction of the air flow above the air guide plate 200 changes.

Also, in the present invention, the air flow above the air guide plate 200 can be controlled by an air flow control unit 240 using porosity that is based on "Low-Speed Wind Tunnel Testing" by William H. Rae. The air flow control unit 240 is installed on the air guide plate and further attenuates the strength and perturbation component of the turbulence flowing above the air guide plate 200.

The air flow control unit 240 can be realized by a mesh screen that is installed on the air guide plate 200 and has a screen structure to attenuate turbulence in the axial direction and a honeycomb structure to attenuate turbulence in a lateral direction of the air flowing above the air guide plate 200. The mesh screen is referred to as a turbulence screen. For example, a mesh screen attached to the front of a microphone avoids a turbulence phenomenon when noise accompanying air flow in a ventilating pipe is measured. That is, the mesh screen is an air flow control unit that reduces the level of noise and turbulence by changing an anisotropic strong turbulence to an isotropic weak turbulence.

In the present invention, a through hole 260 may be formed at the central portion of the air guide plate 200 so that the disk chucking apparatus may be installed.

As described above, in the disk drive according to the present invention, the flow of turbulence is controlled by the air guide plate 200 so that the turbulence flow does not collide with the front side portion of the disk drive. Because the velocity v of turbulence of the free flow layer under the air guide plate 200 that collides with the front side portion decreases, noise transmitted to the front side is reduced.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A disk drive reducing noise, comprising:
a disk tray sliding in and out of the disk drive and on which a disk is placed;
a disk driving portion rotating the disk at a predetermined speed;
a data recording/reproducing unit recording data on the disk or reproducing data from the disk; and
an air guide plate installed between an upper surface of the disk tray and an upper cover plate of the disk drive, parallel to the disk tray, and separating an air flow area, the air flow above the disk generated by rotation of the disk being divided into turbulence under the air guide plate and turbulence above the air guide plate,
wherein the air guide plate comprises an end portion having a wedge shape that is inclined in a direction in which the air flow above the disk proceeds to move the air flow above the disk up along the air guide plate, and
wherein the air guide plate is installed above and at least partially overtop of the disk.

2. The disk drive as claimed in claim 1, wherein the disk drive further comprises a first guide installed on the air guide plate, perpendicular to an upper surface of the air guide plate, along an edge of the air guide plate to rotate the air flowing up along the air guide plate in a same direction as a direction in which the disk rotates.

3. The disk drive as claimed in claim 2, wherein the disk drive further comprises a second guide installed on the air guide plate parallel to the first guide, separated a predetermined distance from the first guide, and perpendicular to the upper surface of the air guide plate, to divide a passing route of the air flow into two or more routes and rotate the air flowing up along the air guide plate in the same direction as the direction in which the disk rotates.

4. The disk drive as claimed in claim 3, further comprising a guide vein installed on the air guide plate to rotate the air flowing up along the air guide plate in the same direction as the direction in which the disk rotates.

5. The disk drive as claimed in claim 4, further comprising a porous air flow control unit installed on the air guide plate to attenuate a strength and a perturbation component of the turbulence flowing above the air guide plate.

6. The disk drive as claimed in claim 3, further comprising a porous air flow control unit installed on the air guide plate to attenuate a strength and a perturbation component of the turbulence flowing above the air guide plate.

7. The disk drive as claimed in claim 2, further comprising a porous air flow control unit installed on the air guide plate to attenuate a strength and a perturbation component of the turbulence flowing above the air guide plate.

8. A disk drive reducing noise, comprising:
a disk tray sliding in and out of the disk drive and on which a disk is placed;
a disk driving portion rotating the disk at a predetermined speed;
a data recording/reproducing unit recording data on the disk or reproducing data from the disk;
an air guide plate installed between an upper surface of the disk tray and an upper cover plate of the disk drive, parallel to the disk tray, and separating an air flow area, the air flow above the disk generated by rotation of the disk being divided into turbulence under the air guide plate and turbulence above the air guide plate; and
a porous air flow control unit installed on the air guide plate to attenuate a strength and a perturbation component of the turbulence flowing above the air guide plates,
wherein the air guide plate comprises an end portion having a wedge shape that is inclined in a direction in which the air flow above the disk proceeds to move the air flow above the disk up along the air guide plate.

9. The disk drive as claimed in claim 8, wherein the porous air flow control unit comprises a mesh screen installed on the air guide plate having a screen structure to attenuate turbulence flowing above the air guide plate in an axial direction and a honeycomb structure to attenuate turbulence in a lateral direction.

10. A disk drive reducing noise, comprising:
a disk tray sliding in and out of the disk drive and on which a disk is placed;
a disk driving portion rotating the disk at a predetermined speed;
a data recording/reproducing unit recording data on the disk or reproducing data from the disk; and
an air guide plate installed between an upper surface of the disk tray and an upper cover plate of the disk drive, parallel to the disk tray, and separating an air flow area, the air flow above the disk generated by rotation of the disk being divided into turbulence under the air guide plate and turbulence above the air guide plate,
wherein a through hole is formed at a central portion of the air guide plate through which a disk chucking apparatus is installed,
wherein the air guide plate comprises an end portion having a wedge shape that is inclined in a direction in which the air flow above the disk proceeds to move the air flow above the disk up along the air guide plate, and
wherein the air guide plate is installed above and at least partially overtop of the disk.

11. A disk drive, comprising:
a disk tray receiving a disk that is rotated, producing turbulence having a turbulence area above the rotating disk;
an upper cover plate covering the disk drive; and
an air guide plate placed between the disk tray and the upper cover plate to separate air flow above the rotating disk into turbulence under the air guide plate and turbulence above the air guide plate, the turbulence area under the air guide plate being reduced to reduce the turbulence above the rotating disk,
wherein the air guide plate comprises an end portion having a wedge shape that is inclined in a direction of the air flow to move the air flow above the disk up along the air guide plate, reducing a perturbation portion of the turbulence above the air guide plate, and
wherein the air guide plate is installed above and at least partially overtop of the disk.

12. The disk drive as claimed in claim 11, wherein the disk drive further comprises a first guide installed on the air guide plate along an edge of the air guide plate to rotate the air flowing up along the air guide plate in a same direction as a direction in which the disk rotates, reducing turbulence at a front edge of the disk drive.

13. The disk drive as claimed in claim 12, wherein the disk drive further comprises a second guide installed on the air guide plate, parallel to the first guide and separated a predetermined distance from the first guide, to divide a passing route of the air flow into two or more routes and rotate the air flowing up along the air guide plate in the same direction as the disk rotation direction.

14. The disk drive as claimed in claim 13, wherein the disk drive comprises a plurality of second guides on the air guide plate to reduce perturbation due to a friction force.

15. The disk drive as claimed in claim 13, further comprising a guide vein installed on the air guide plate to rotate the air flow moving up along the air guide plate in the same direction as the disk rotation direction, reducing turbulence generated above the air guide plate where a direction of the air flow changes.

16. The disk drive as claimed in claim 13, further comprising a porous air flow control unit installed on the air guide plate to attenuate a strength and a perturbation component of the turbulence flowing above the air guide plate.

17. The disk drive as claimed in claim 12, further comprising a porous air flow control unit installed on the air guide plate to attenuate a strength and a perturbation component of the turbulence flowing above the air guide plate.

18. The disk drive as claimed in claim 11, wherein the turbulence above the air guide plate is not directly influenced by the rotating disk.

19. A disk drive, comprising:
a disk tray receiving a disk that is rotated, producing turbulence having a turbulence area above the rotating disk;
an upper cover plate covering the disk drive;
an air guide plate placed between the disk tray and the upper cover plate to separate air flow above the rotating disk into turbulence under the air guide plate and turbulence above the air guide plate, the turbulence area under the air guide plate being reduced to reduce the turbulence above the rotating disk; and
a porous air flow control unit installed on the air guide plate to attenuate a strength and a perturbation component of the turbulence flowing above the air guide plate,
wherein the air guide plate comprises an end portion having a wedge shape that is inclined in a direction of the air flow to move the air flow above the disk up along the air guide plate, reducing a perturbation portion of the turbulence above the air guide plate.

20. The disk drive as claimed in claim 19, wherein the porous air flow control unit comprises a mesh screen installed on the air guide plate having a screen structure to attenuate turbulence flowing above the air guide plate in an axial direction and a honeycomb structure to attenuate turbulence in a lateral direction.

21. A disk drive, comprising:
a disk tray receiving a disk that is rotated, producing turbulence having a turbulence area above the rotating disk;
an upper cover plate covering the disk drive;
an air guide plate placed between the disk tray and the upper cover plate to separate air flow above the rotating disk into turbulence under the air guide plate and turbulence above the air guide plate, the turbulence area under the air guide plate being reduced to reduce the turbulence above the rotating disk; and
a porous air flow control unit installed on the air guide plate to attenuate a strength and a perturbation component of the turbulence flowing above the air guide plate, wherein:
the air guide plate comprises an end portion having a wedge shape that is inclined in a direction in which the air flow above the disk proceeds to move the air flow above the disk up along the air guide plate, and
the air guide plate is installed above and at least partially overtop of the disk.

22. The disk drive as claimed in claim 21, wherein the turbulence above the air guide plate is not directly influenced by the rotating disk.

23. A noise reducing apparatus for a disk drive, the disk drive having an upper cover plate covering the disk drive and a disk tray receiving a disk that is rotated, the rotating disk producing turbulence having a turbulence area above the rotating disk, the noise reducing apparatus comprising:
an air guide plate placed between the disk tray and the upper cover plate to separate air flow above the rotating disk into turbulence under the air guide plate and turbulence above the air guide plate, the turbulence area under the air guide plate being reduced to reduce the turbulence above the rotating disk thereby reducing noise of the disk drive;
an end portion of the air guide plate having a wedge shape that is inclined in a direction of the air flow to move the air flow above the disk up along the air guide plate, reducing a perturbation portion of the turbulence above the air guide plate;
a first guide installed on the air guide plate along an edge of the air guide plate to rotate the air flowing up along the air guide plate in a same direction as a direction in which the disk rotates, reducing turbulence at a front edge of the disk drive;
a second guide installed on the air guide plate, parallel to the first guide and separated a predetermined distance from the first guide, to divide a passing route of the air flow into two or more routes and rotate the air flowing up along the air guide plate in the same direction as the disk rotation direction;
a guide vein installed on the air guide plate to rotate the air flow moving up along the air guide plate in the same direction as the disk rotation direction, reducing turbulence generated above the air guide plate where a direction of the air flow changes; and
a porous air flow control unit installed on the air guide plate to attenuate a strength and a perturbation component of the turbulence flowing above the air guide plate.

24. The disk drive as claimed in claim 23, wherein the disk drive further comprises a plurality of second guides on the air guide plate to reduce perturbation due to a friction force.

25. The disk drive as claimed in claim 23, wherein the porous air flow control unit comprises a mesh screen installed on the air guide plate having a screen structure to attenuate turbulence flowing above the air guide plate in an axial direction and a honeycomb structure to attenuate turbulence in a lateral direction.

26. The disk drive as claimed in claim 23, wherein the turbulence above the air guide plate is not directly influenced by the rotating disk.

27. The disk drive as claimed in claim 23, wherein the air guide plate is installed above and at least partially overtop of the disk.

28. A noise reducing apparatus for a disk drive, the disk drive having an upper cover plate covering the disk drive and a disk tray receiving a disk that is rotated, the rotating disk producing turbulence having a turbulence area above the rotating disk, the noise reducing apparatus comprising:
an air guide plate placed between the disk tray and the upper cover plate to separate air flow above the rotating disk into turbulence under the air guide plate and turbulence above the air guide plate, the turbulence above the air guide plate being not directly influenced by the rotating disk, and the turbulence area under the air guide plate being reduced to reduce the turbulence above the rotating disk thereby reducing noise of the disk drive; and an end portion of the air guide plate having a wedge shape that is inclined in a direction of the air flow to move the air flow above the disk up along the air guide plate, reducing a perturbation portion of the turbulence above the air guide plate, wherein the air guide plate is installed above at least partially overtop of the disk.

29. The disk drive as claimed in claim 28, wherein the disk drive further comprises a first guide installed on the air guide plate along an edge of the air guide plate to rotate the air flowing up along the air guide plate in a same direction as a direction in which the disk rotates, reducing turbulence at a front edge of the disk drive.

30. The disk drive as claimed in claim 29, wherein the disk drive further comprises a second guide installed on the air guide plate, parallel to the first guide and separated a predetermined distance from the first guide, to divide a passing route of the air flow into two or more routes and rotate the air flowing up along the air guide plate in the same direction as the disk rotation direction.

31. The disk drive as claimed in claim 30, wherein the disk drive further comprises a plurality of second guides on the air guide plate to reduce perturbation due to a friction force.

32. The disk drive as claimed in claim 30, further comprising a guide vein installed on the air guide plate to rotate the air flow moving up along the air guide plate in the same direction as the disk rotation direction, reducing turbulence generated above the air guide plate where a direction of the air flow changes.

33. A noise reducing apparatus for a disk drive, the disk drive having an upper cover plate covering the disk drive and a disk tray receiving a disk that is rotated, the rotating disk producing turbulence having a turbulence area above the rotating disk, the noise reducing apparatus comprising:

an air guide plate placed between the disk tray and the upper cover plate to separate air flow above the rotating disk into turbulence under the air guide plate and turbulence above the air guide plate, the turbulence above the air guide plate being not directly influenced by the rotating disk, and the turbulence area under the air guide plate being reduced to reduce the turbulence above the rotating disk thereby reducing noise of the disk drive;

an end portion of the air guide plate having a wedge shape that is inclined in a direction of the air flow to move the air flow above the disk up along the air guide plate, reducing a perturbation portion of the turbulence above the air guide plate; and a porous air flow control unit installed on the air guide plate to attenuate a strength and a perturbation component of the turbulence flowing above the air guide plate.

34. The disk drive as claimed in claim 33, wherein the porous air flow control unit comprises a mesh screen installed on the air guide plate having a screen structure to attenuate turbulence flowing above the air guide plate in an axial direction and a honeycomb structure to attenuate turbulence in a lateral direction, the mesh screen reducing noise and turbulence by changing an anisotropic strong turbulence to an isotropic weak turbulence.

* * * * *

UNITED STATES PATENT AND TRADEMARK OFFICE
CERTIFICATE OF CORRECTION

PATENT NO. : 7,337,451 B2 Page 1 of 1
APPLICATION NO. : 10/612055
DATED : February 26, 2008
INVENTOR(S) : Myung-ryul Choi It is certified that error appears in the above-identified patent and that said Letters Patent is hereby corrected as shown below:

Column 10, Line 6, change "plates," to --plate,--.

Signed and Sealed this

Twenty-ninth Day of July, 2008

JON W. DUDAS
*Director of the United States Patent and Trademark Office*